May 29, 1951          A. KNORR          2,555,138
GREENHOUSE SUBSTITUTE GLASS INSTALLING FIXTURE
Filed Jan. 26, 1949
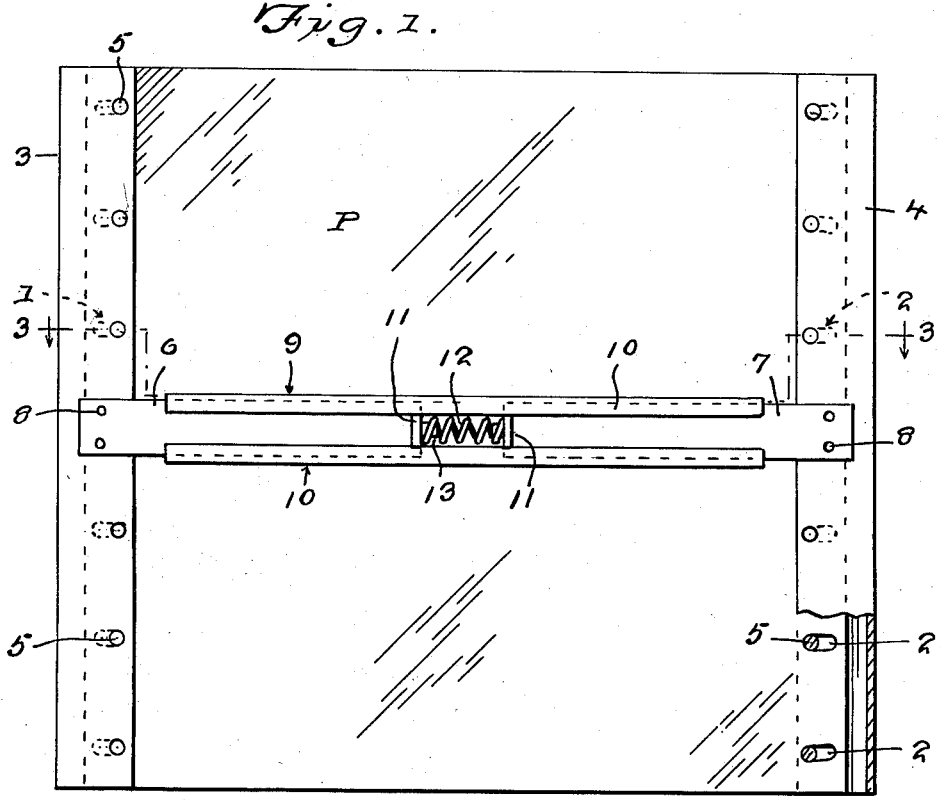
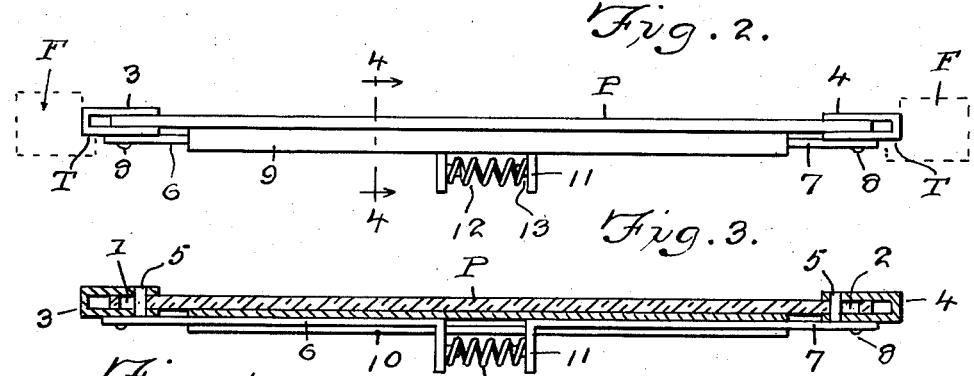
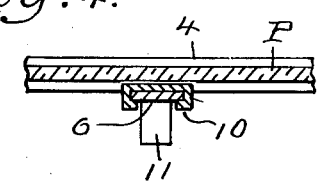
INVENTOR.
August Knorr
BY Victor J. Evans & Co.
ATTORNEYS Patented May 29, 1951

2,555,138

UNITED STATES PATENT OFFICE 2,555,138

GREENHOUSE SUBSTITUTE GLASS INSTALLING FIXTURE

August Knorr, Chicago, Ill.

Application January 26, 1949, Serial No. 72,777

1 Claim. (Cl. 20—56)

The present invention relates to improvements in the general class of building structures, such as greenhouses for plant husbandry, and more specifically to a greenhouse substitute glass installing fixture which while well adapted for various other purposes and uses, is especially designed as a replacement for defective or broken light-sections in a greenhouse roof or cover.

The novel fixture, in the nature of a portable, self-contained window sash, may be employed in repairing a greenhouse roof from the interior of the greenhouse thereby eliminating the loss of time, labor, and material required for an outside repair job; and for this purpose the fixture is manually passed outwardly through the roof opening and readily installed in the roof structure without outside help.

The fixture of the invention includes a minimum number of parts that may with facility be manufactured at low cost of production and the parts may be assembled with convenience to provide a self-contained, portable, extensible and contractible fixture that is durable and efficient in the performance of its required functions.

The invention consists in certain novel features of construction and combinations and arrangements of parts as will hereinafter be described and more particularly set forth in the appended claim.

In the accompanying drawings I have illustrated a complete example of a physical embodiment of my invention in which the parts are combined and arranged in accord with one mode I have devised for the practical application of the principles of my invention. It will however be understood that changes and alternations are contemplated and may be made in these exemplifying drawings and structures, within the scope of my claim, without departing from the principles of the invention.

Figure 1 is a plan view of a fixture in which my invention is physically embodied.

Figure 2 is an edge view of the fixture.

Figure 3 is a sectional view at line 3—3 of Fig. 1; and

Figure 4 is a sectional view at line 4—4 of Fig. 2.

In order that the general arrangement and relation of parts may readily be understood, I have shown by dotted lines in Fig. 2 a pair of laterally spaced horizontal, and parallel frame bars F to indicate the supporting frame of a greenhouse roof, and these frame bars are provided with grooves, and tongues or ledges T upon which the window fixtures of the roof are seated and retained.

From the interior of the greenhouse, the portable fixture, in contracted size, is manually passed through the opening in the roof, automatically extended or expanded, and secured between the two frame bars F.

In carrying out my invention the rectangular pane P of glass, or any other material suitable for the purpose is provided with two parallel series 1 and 2 of slots arranged along the opposite lateral edges of the pane, and the pane is mounted in a generally H-shaped frame or sash having two laterally spaced side bars 3 and 4 here shown as of channel shape in cross section with the lateral edges of the pane inserted in the grooves of the channel parts.

Rivets or anchoring pins 5 mounted transversely in the side bars are passed loosely through the laterally extending slots, to permit extension of the side bars, as well as contraction of the side bars with relation to the opposite edges of the pane. As the fixture is passed outwardly or upwardly through the roof opening, the side bars are held in contracted position, and when the side bars are manually seated on the tongues T, the side bars are automatically released and expanded into permanently fixed position in the roof structure.

To permit extension and contraction of the H-frame each side bar 3, 4, is equipped with a centrally arranged arm or cross plate as 6 and 7, the outer ends of which are secured to a side bar, as by rivets 8; and these cross arms are slidably mounted in a housing in the nature of a channel strip 9 having opposed flanges 10.

The adjoining inner ends of the cross arms are bent downwardly to form hand-pressure flanges 11, and a spring 12 is interposed between the spaced flanges 11 and retained by bosses 13 of the flanges, which resiliently presses the two side bars 3 and 4 outwardly from the outer edges of the pane P.

To reduce the size of the fixture as it is passed through the restricted opening, the flanges 11, 11 are pressed together to contract the side bars on the edges of the pane; then the fixture is lowered into its supporting seat, the flanges are released, and the spring projects the side bars into fixed supporting position for the fixture, and the latter is a replacement for repairing the greenhouse roof or covering.

Having thus fully described my invention, what

I claim as new and desire to secure by Letters Patent is:

In a greenhouse substitute glass installing fixture the improvement comprising a pair of channel shaped side bars, each of said bars having a series of cross pins extended transversely thereof and positioned in relative spaced relation to each other longitudinally of the bars, a pane having a plurality of laterally extending slots having its lateral edges mounted in the bars and the slots coacting with the cross pins, a cross arm fixed at one end to each of said bars at the central portion thereof, and extending toward each other over said pane, a channel guide strip having flanges along its longitudinal marginal edges engaging said arms to slidably mount said arms therein, upturned flanges on the free ends of the arms in opposed relation to each other and engaging the flanges on the guide strip and a spring member interposed between the upturned flanges for laterally projecting the side bars to seat the side bars in a support.

AUGUST KNORR.

REFERENCES CITED

The following references are of record in the file of this patent:

UNITED STATES PATENTS

| Number | Name | Date |
|---|---|---|
| 1,150,365 | Heinsohn | Aug. 17, 1915 |
| 1,436,952 | Finckh | Nov. 28, 1922 |
| 1,653,184 | Kolumbus | Dec. 20, 1927 |